M. C. PREVO.
ROCK PICKING MACHINE.
APPLICATION FILED DEC. 27, 1913.

1,193,298.

Patented Aug. 1, 1916.
4 SHEETS—SHEET 1.

Witnesses

Inventor
Manford C. Prevo,
by
his Attorney

M. C. PREVO.
ROCK PICKING MACHINE.
APPLICATION FILED DEC. 27, 1913.

1,193,298.

Patented Aug. 1, 1916.
4 SHEETS—SHEET 2.

Witnesses

Inventor
Manford C. Prevo,
by
his Attorney

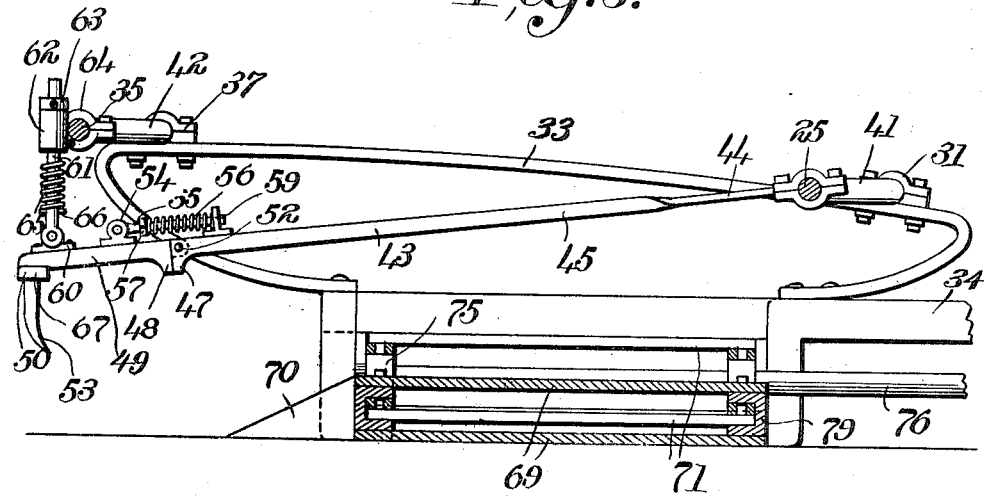
Fig. 5.
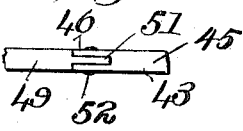
Fig. 10.
Fig. 4.
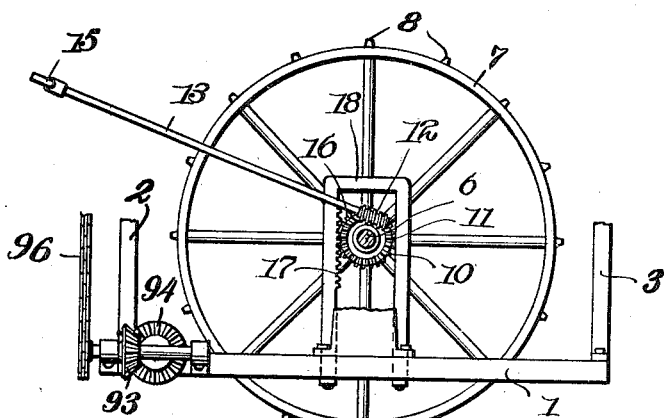

M. C. PREVO.
ROCK PICKING MACHINE.
APPLICATION FILED DEC. 27, 1913.
1,193,298.
Patented Aug. 1, 1916.
4 SHEETS—SHEET 4.
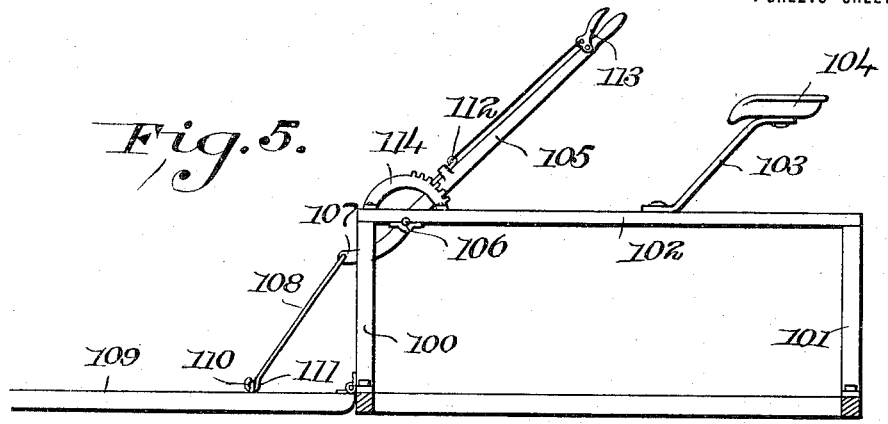
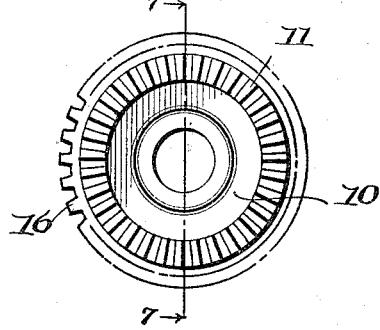
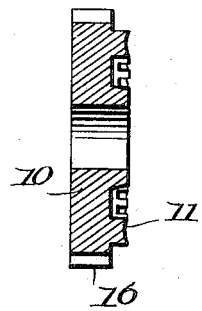
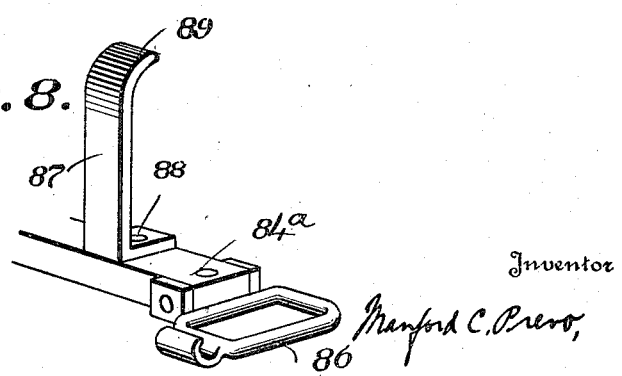

UNITED STATES PATENT OFFICE.

MANFORD C. PREVO, OF PURDY, MISSOURI.

ROCK-PICKING MACHINE.

1,193,298.  Specification of Letters Patent.  Patented Aug. 1, 1916.

Application filed December 27, 1913. Serial No. 809,036.

*To all whom it may concern:*

Be it known that I, MANFORD C. PREVO, a citizen of the United States, residing at Purdy, in the county of Barry and State of Missouri, have invented certain new and useful Improvements in Rock-Picking Machines, of which the following is a specification.

This invention relates to machines for gathering rocks and stones from the surface of a field for the purpose of placing the ground in a better condition for cultivation and it refers more particularly to that class of rock gathering machines which embody elevating mechanism for depositing the rocks gathered in the bed of a wagon.

An object of this invention is the provision of a machine as specified with which the gathering of rocks or stones is accomplished by means of a plurality of reciprocatory arms having terminal gathering devices which coact with a plurality of guards and alternately engage the soil, gathering not only the rocks resting upon the surface, but those which may be slightly embedded in the soil, and to adjustably mount these reciprocatory gathering devices upon the frame of the machine so that the scope of their gathering reach or facilities may be altered to suit conditions.

Another object of this invention is to provide a machine of this nature which has an elongated gathering bar provided with a carrier, for gathering the rocks or stones in swaths of considerable width and carrying them to the elevator which deposits them in a wagon bed.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which—

Figures 1, 9:
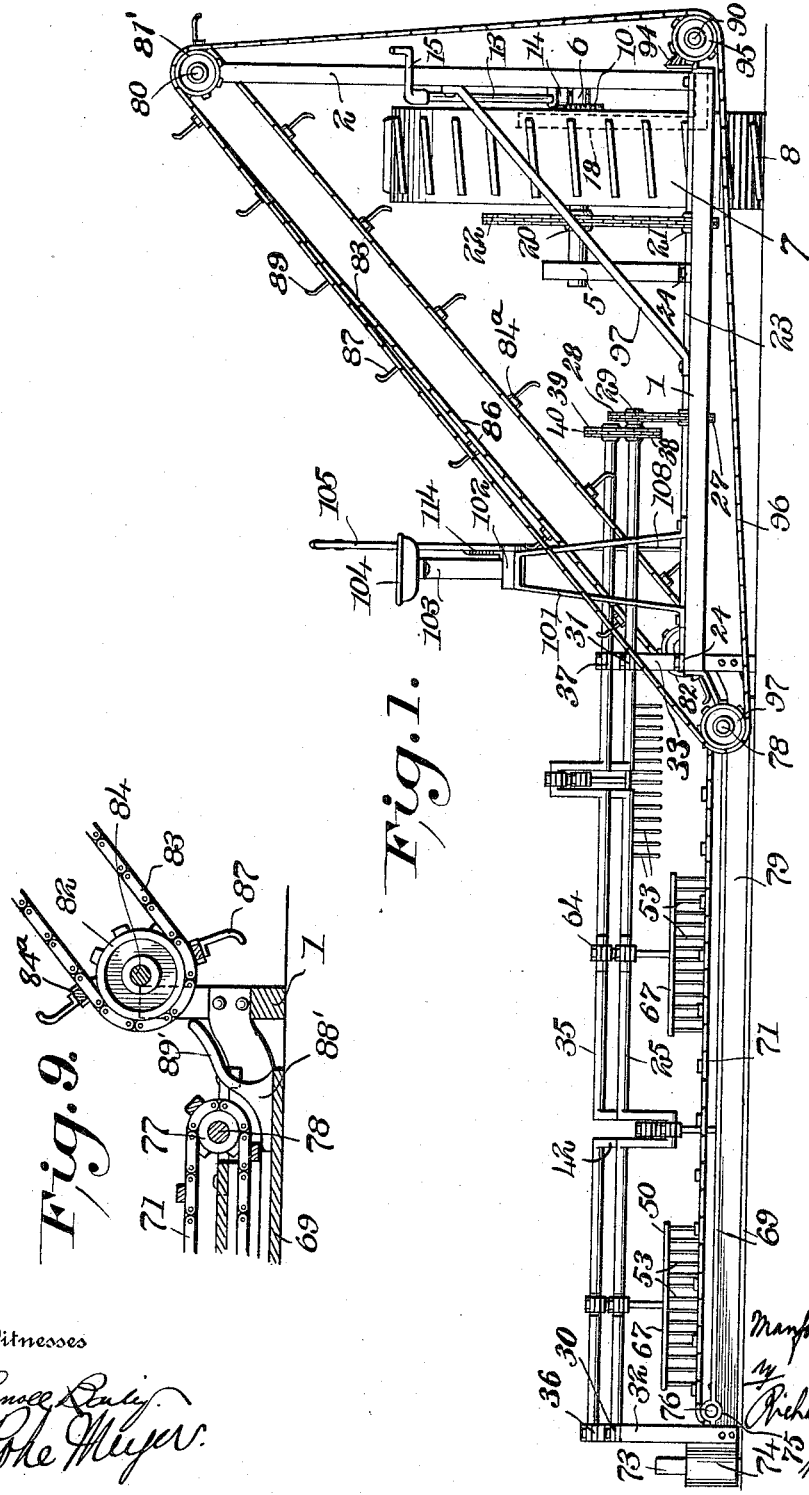
Figure 2:
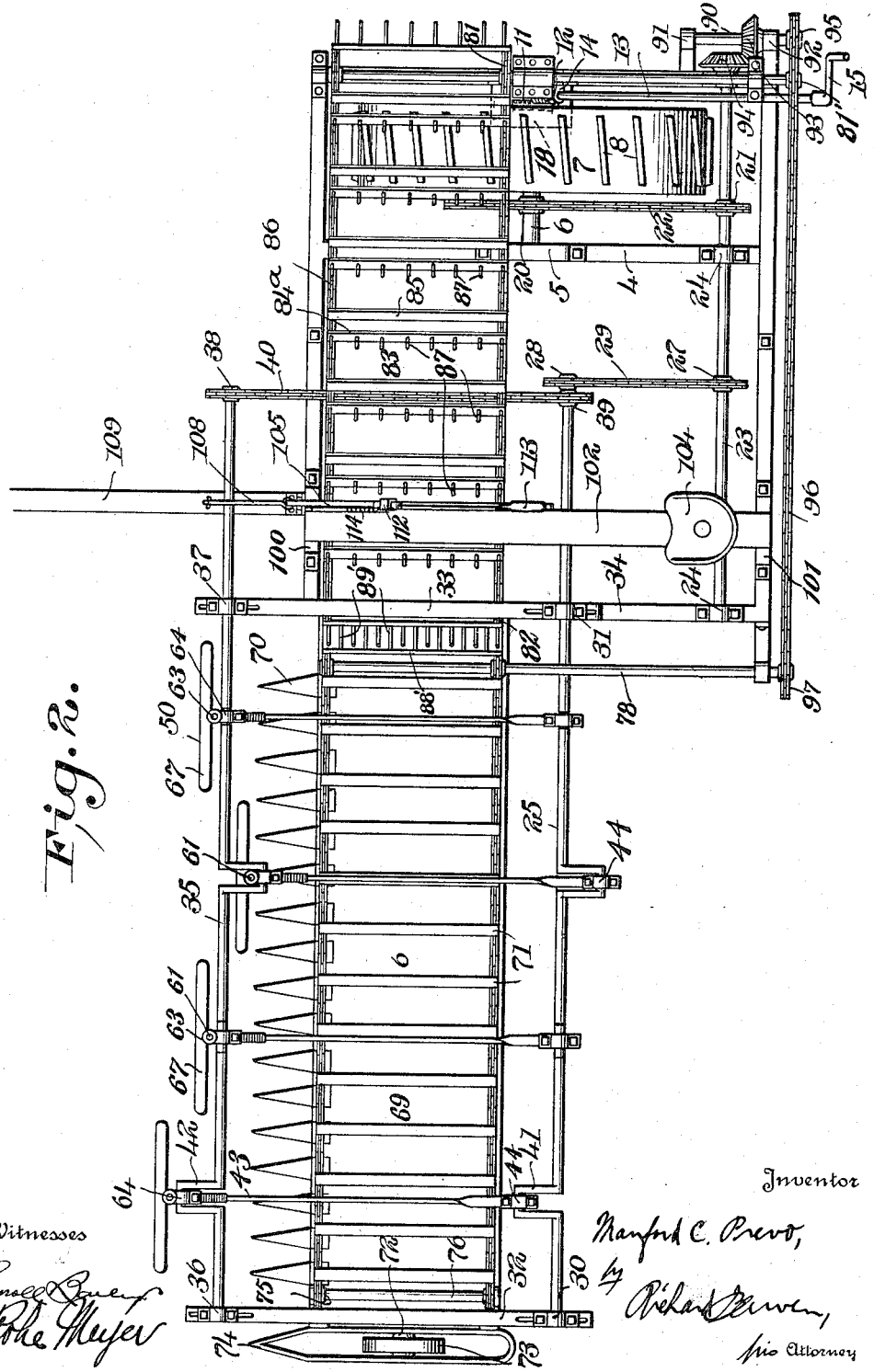

Figure 1 is a rear elevation of the rock gathering machine, Fig. 2 is a top plan view of the rock gathering machine, Fig. 3 is a detail sectional view through a part of the gathering machine showing the reciprocatory gathering arms in elevation, Fig. 4 is a detail view of a part of the machine showing the mechanism for raising and lowering the gathering mechanism, into or out of a gathering position, Fig. 5 is a detail view showing the tilting lever for the tongue of the machine, Fig. 6 is a detail view of a part of the mechanism shown in Fig. 4, Fig. 7 is a sectional view on the line 7—7 of Fig. 6, Fig. 8 is a detail perspective view of parts of the elevator, Fig. 9 is a detail sectional view of a part of the rock gathering machine showing a communicating relationship between the elevator and carrier for moving the rock to a position to be received by the carrier, Fig. 10 is a detail plan view of a part of the rock gathering means.

Referring to the drawings by numeral, 1 designates the frame of the machine which has upstanding vertical posts 2 and 3 mounted upon one end thereof. The frame 1 has a cross-piece 4 extending laterally thereacross, which cross-piece has a U-shaped member 5 mounted thereupon substantially equidistant of its ends. The U-shaped member 5 is provided with teeth upon the inner side of its legs, and a gear, which forms a bearing for a shaft or axle 6, is adjustably mounted therein. The purpose of this mounting will be hereinafter more fully set forth. The axle 6 has a traction wheel 7 mounted thereupon, which traction wheel is provided with a plurality of corrugations 8 formed upon its periphery, so as prevent it from slipping or skidding and to aid in the efficient propelling of the device.

The shaft 6 has a gear 10 mounted thereupon, which gear has worm teeth 11 formed upon one face thereof. These worm teeth 11 mesh with a worm 12 which is carried by the lower end of a rod 13. The rod 13 is journaled in a bearing 14 which is carried by one of the vertical posts and it has a crank handle 15 mounted upon its upper end. The teeth 16 which are formed upon the periphery of the gear 10 mesh with rack teeth 17 which are formed upon the inner edge of one of the legs of a U-shaped bracket 18. The U-shaped bracket 18 has the terminal ends of its legs secured to the frame 1 in any suitable manner, so that when the gear 10 is rotated through the medium of the crank handle 15, the rod 13 and the worm 12, the teeth 16 will engage the rack teeth 17 and either raise or lower the frame 1 and the various parts of the mechanism carried thereby, according to the direction of the rotation of the crank handle 15. In this manner, the frame 1 and the rock gathering means, which will be hereinafter more fully described, may be raised out of engagement with the surface of the ground for the transportation of the machine.

Mounted upon the shaft 6 and upon the opposite side of the traction wheel 7, from the gear 10, is a sprocket 20 about which and a sprocket 21, a sprocket chain 22 passes. The sprocket 21 is mounted upon a shaft 23 which is journaled in suitable bearings 24 carried by the frame 1. The rotary motion which is transmitted to the axle 6, by the travel of the machine, is, through the medium of the sprocket chain 22 and the sprockets 20 and 21, imparted to the shaft 23 and from thence to a crank-shaft 25 through the medium of sprockets 27 and 28 and a sprocket chain 29.

The crank shaft 25 extends longitudinally of the frame 1 of the rock picking machine and is journaled in bearings 30 and 31, which bearings are adjustably carried by supporting frames 32 and 33. The supporting frames 32 and 33 are preferably constructed of flat sheet metal, having both their ends bent downwardly, as is clearly shown in the case of the latter frame in Fig. 3 of the drawings, so as to support the bearings at a suitable elevation above the conveyer and the supporting frame 33 has its ends secured in any suitable manner to the end 34 of the frame 1. A second crank shaft 35 which is rotatably journaled in bearings 36 and 37, which are adjustably carried by the supporting frames 32 and 33, respectively, is disposed parallel with the crank shaft 25 and is operatively connected thereto by means of sprocket wheels 38 and 39 and a sprocket chain 40. The crank portions 41 of the crank-shaft 25 and the crank portions 42 of the crank-shaft 35 are disposed directly in alinement with each other and have the reciprocating gathering means 43 connected thereto. The crank portions 41 have the ends 44 of the arms 45 of the reciprocatory gathering means 43, connected to the vertex thereof in any suitable manner, such as by the metallic straps which are shown in Fig. 3 of the drawings.

The arms 45 have their free ends bifurcated, as is shown at 46 and also have depending shoulders 47 formed thereupon. The shoulders 47 abut against the shoulders 48, which are formed upon the bars 49, when the rock picking or gathering devices 50 are in a position to efficiently engage the rocks and gather them. The bars 49 have tongues 51 formed upon their ends, upon which the shoulders 48 are formed, and these tongues are seated in the bifurcations 46 of the arms 45 and the arms 45 and the bars 49 are pivotally connected through the medium of the bifurcations 46 and the tongues 51 and the pins 52, so that when the teeth 53 of the rock gathering devices 50 engage a root or other permanent article carried by the ground, they may be forced upwardly so as to pass over the same. The shoulders 47 and 48 limit the downward pivotal movement of the rock gathering devices 50 and the bars 49.

The bars 49 have bearings 54 mounted upon their upper surface, which bearings have pins 55 pivotally connected thereto. The pins 55 have coil springs 56 mounted thereabout, which springs are held in proper position, by means of nuts or washers 57 mounted upon the pins. The pins 55 are slidably mounted in brackets 59 against which the springs 56 abut. The brackets 59 are secured in any suitable manner to the arms 45 of the rock gathering devices and these pins together with the springs 56 form an arrangement whereby the rock gathering devices 50 and the bars 49 will be forced downwardly into the position which is shown in Fig. 3 of the drawings, after the same has engaged a root or the like, and been forced upwardly, or in other words, they together with the pivotal connection between the arms 45 and the bars 49 form a break joint similar to those employed in agricultural cultivators.

The bars 49 have bearings 60 mounted upon their upper surface, which bearings have pins 61 pivotally connected thereto and extending upwardly therefrom. The pins 61 extend through bearings 62, and have collars 63 mounted upon their upper ends which protrude beyond the bearings 62, for holding them in various adjusted positions within the bearings 62. The bearings 62, which are vertically disposed, have other bearings 64 formed thereupon and extending laterally thereto. The bearings 64 are mounted upon the vertex portion of the crank 42. Coil springs 65 are mounted upon the pins 61 and have their lower ends engaging pins 66 which are inserted laterally through the pins 61. These coil springs 65 aid the springs 56 in forcing the rock gathering devices 50 downwardly or into an operative position, after they have been forced upwardly by contact with a rigid article above the soil over which the rock gathering machine has passed and further tend to absorb the shock occasioned by the forcing upwardly of the rock gathering devices 50.

By altering the position of the bearings 30 31 36 and 37 upon the supporting structures 32 and 33, the scope of the rock gathering devices 50 may be varied, as this adjusting of the bearing boxes will either increase or decrease the length of the forward stroke of the arms 45 and the bars 49 and consequently the stroke of the rock gathering devices 50. The rock gathering devices 50 are formed much after the order of an ordinary garden rake, having a plurality of sharpened teeth 53 depending from a body portion or supporting bar 67.

From the foregoing description taken in connection with the drawings, it will be readily apparent that the rotation generated by the travel of the machine will be imparted through the various sprockets and sprocket chains to the crank shafts 25 and 35 and will be in turn transmitted, in a reciprocatory movement to the rock gathering devices 50, causing them to move in an oscillatory manner for the gathering of the rock.

Extending outwardly from the end 34 of the frame 1 and directly beneath the arms 45 is a platform 69 which has a plurality of pointed guards 70 connected to one side thereof and pointing toward the gathering devices 50. These pointed guard members 70 coact with the gathering devices 50 for gathering the rock off the surface of the field over which the rack gathering machine is drawn and aid in properly forcing the rock gathered upon the carrier 71. The platform 69 has a shaft 72 connected to its outer end, upon which is mounted a traction-wheel 73. A divider board or guard member 74, preferably constructed of sheet metal, is connected to the end of the platform 69 and extends about the wheels 73 forming a protection for the latter against the rocks and other foreign articles upon the surface of the field.

The platform 69 has bearings 75 mounted upon its outer end, in which bearings is journaled a shaft 76. The shaft 76 has sprockets (not shown) mounted thereupon about which sprockets passes the carrier 71. The carrier 71 which may be of any of the ordinary type of carriers now in use, having means formed thereupon for efficiently carrying the stones or rocks gathered by the gathering devices 50 and the teeth 53, also passes about sprockets 77 which are mounted upon a shaft 78, which shaft is carried by the end of the platform opposite to that which has the shaft 76 mounted thereupon. The platform 69 is provided with what is commonly known as a double bottom, so as to prevent the upper and lower lengths of the carrier 71 from interfering with each other during the operation of the same.

The upstanding posts 2 and 3 have a shaft 80 journaled in bearings formed upon their upper ends. The shaft 80 has sprockets 81 mounted thereupon, about which and the sprockets 82 a carrier 83, for elevating the rocks from the carrier 71 into the body of a wagon, passes. The sprockets 82 are carried by a shaft 84 which is journaled in any suitable type of bearings mounted upon the upper surface of the frame 1.

The carrier 83 is constructed of a plurality of cross-pieces 84$^a$ and 85 which have links 86 mounted in any suitable manner upon their outer ends. The links 86 are connected one with the other and form a sprocket chain which passes about the sprockets 81 and 82 and operates the carrier 83. The cross pieces 84$^a$ have a plurality of members 87 securely attached thereto in any suitable manner, such as by bolts or rivets 88. The members 87 are constructed of metal and have their upper ends 89 curved so as to more efficiently engage the rocks or stones which are gathered by the gathering devices and deposited by the carrier 71 upon the elevator or carrier 83.

The platform 69 has mounted upon its end, which is adjacent the carrier or elevator 83, a member 88' which has a plurality of prongs or fingers 89' formed thereupon and arranged so that the rocks which are carried by the carrier 71 will be deposited upon these prongs or fingers and engaged by the members 87 and properly elevated so as to be deposited in the wagon bed. These prongs or fingers 89' are further arranged so that the members 87 will pass between the same to permit of the efficient receiving of the rocks by these members without in any manner retarding the operation of the device.

A stub-shaft 90 is journaled in bearings 91 and 92 which are carried by the frame 1 and it has a beveled gear 93 mounted thereupon. The beveled gear 93 meshes with a second beveled gear 94 which is carried by one end of the shaft 23 and rotary motion is imparted to the stub-shaft 90 through the medium of the beveled gears 93 and 94 and from the shaft 23. The stub-shaft 90 has a sprocket 95 mounted upon its outer end, which sprocket has a sprocket chain 96 passed thereabout. The sprocket chain 96 also passes about the sprocket 81' which is mounted upon the shaft 80, at the top of the upstanding posts 2 and 3 and also about a sprocket 97 which is mounted upon the end of the shaft 78. In this manner, rotary motion is imparted, from the shaft 23 to the shafts 78 and 80, which control the operation of the carrier 71 and the elevator 83.

The upstanding posts 2 and 3 are braced by angularly disposed brace rods 97 which are connected to the frame 1, as is clearly shown in Figs. 1 and 2 of the drawings.

The frame 1 has U-shaped brackets 100 and 101 connected thereto, which U-shaped brackets have a bar 102 connected to their vertex which bar has a seat supporting member 103 mounted thereupon. A seat 104 of the ordinary type used in agricultural implements is mounted upon the seat supporting member 103. The bar 102 also has a lever 105 pivotally connected thereto as by means of the pin 106. The lever 105 has its lower or short end 107 slightly curved, as is clearly shown in Fig. 5 of the drawings. The curved end 107 of the lever 105 has a link or rod 108, loosely connected thereto, which rod is in turn connected to the tongue 109 of the rock gathering machine, through the medium of an eye-bolt 110 and the curved end 111 of the rod. The lever 105 has a dog mechanism 112 carried thereby, which mechanism is operated by a hand-grip 113 and coacts with a quadrant 114 for tilting the tongue 109, for adjusting the angle of the elevation of the rock gathering proclivities of the machine.

From the foregoing description taken in connection with the accompanying drawings the advantages of the construction and of the method of operation of the improved rock gathering machine will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a rock picking machine, a wheeled frame, a horizontal platform projecting laterally from the frame near the ground and beyond the wheel base, a plurality of reciprocating means for drawing rocks from the ground toward the platform, means projecting from the front of said platform to guide the rocks thereonto, a carrier on said platform, and a carrier on the frame that coöperate to transport gathered spoil to a point of disposal.

2. In a rock picking machine, a wheeled frame, a horizontal platform projecting laterally from the frame near the ground and beyond the wheel base, a plurality of reciprocating means acting in front of the platform for drawing rocks from the ground toward said platform, horizontal fingers having upwardly inclined top surfaces projecting from the front of the platform for directing the gathered rocks upon the platform, and coöperating carriers on the platform and on the frame to transport the gathered spoil to a point of disposal.

3. In a rock picking machine, a frame, a traction wheel mounted in said frame, a horizontal platform projecting laterally from the frame near the ground and beyond the wheel base, a pair of parallel crank shafts extending longitudinally of said platform and above the same, driving means between the traction wheel and said shafts, gathering means operable over the ground in front of said platform and actuated by said crank shaft and coöperating carriers on the platform and on the frame to transport the gathered spoil to a point of disposal.

4. In a rock picking machine, a frame, a traction wheel mounted in said frame, a horizontal platform projecting laterally from the frame near the ground and beyond the wheel base, a pair of horizontal shafts extending longitudinally of said platform and above the same, driving means between said shafts and the traction wheel, a plurality of reciprocating gathering means operable upon the ground in front of the platform for drawing rocks to said platform and actuated by said crank shafts, and coöperating carriers on said platform and on the frame to transport the gathered spoil to a point of disposal.

5. In a rock picking machine, a frame, a traction wheel mounted in said frame, a horizontal platform projecting laterally from the frame near the ground and beyond the wheel base, a pair of parallel horizontal shafts extending longitudinally of the platform and above the same, driving means between the said shafts, and the traction wheel, a plurality of reciprocating gathering devices operable upon the ground in front of the platform for drawing rocks toward said platform and actuated by said crank shafts, a plurality of tapering fingers having upwardly inclined top surfaces projecting from the forward end of said platform to direct the gathered rocks upon the platform, a carrier on said platform, and a carrier on the frame that coöperate to transport the gathered spoil to a point of disposal.

6. In a rock picking machine; a frame, a platform connected to said frame, supporting frames carried by said platform and said frame, a plurality of crank shafts mounted in bearings which are mounted on said supporting frames, and a plurality of rock gathering devices connected to said crank shaft so that the rotation of the crank shaft will impart reciprocatory movement to the rock gathering devices.

7. In a rock picking machine; a frame, a platform connected to said frame, supporting means carried by said platform and said frame, a plurality of crank shafts mounted in bearings which are mounted on said supporting frames, and a plurality of rock gathering devices connected to said crank shaft so that the rotation of the crank shafts will impart reciprocatory movement to the rock gathering devices, said bearings adjustably carried by said supporting frames whereby the gathering scope of said gathering means is varied.

8. In a rock picking machine; a frame, a platform connected to said frame, supporting frames carried by said platform and said first named frame, a plurality of crank shafts mounted in bearings which are mounted on said supporting frames and a plurality of gathering devices connected to said crank shaft so that the rotation of the crank shaft will impart reciprocatory movement to the gathering devices, means connected to said crank shaft for imparting rotary motion thereto, above the travel of the rock picking machine, said bearings adjustably carried by said supporting frames whereby the gathering scope of said gathering devices is varied, said gathering devices resiliently connected to one of said crank shafts and being composed of two sections pivotally connected, whereby the gathering devices may be forced upwardly, when contacting with a rigid article.

9. In a rock picking machine; a frame, a platform connected to one end of said frame, a carrier supported by said platform, a plurality of guard members mounted upon one side of said platform, crank shafts supported by bearings carried by said platform and said frame, a plurality of rock gathering devices carried by said crank shafts, said rock gathering devices connected to said crank shafts in such a manner that the rotation of the crank shafts will impart reciprocatory movement to the rock gathering devices, a shaft carried by said frame, a traction wheel rigidly mounted upon said shaft, and means connected to said shaft whereby said crank shafts and said carrier will be operated by the rotation of said traction wheel.

10. In a rock picking machine; a frame, a platform connected to one end of said frame, a carrier supported by said platform, a plurality of guard members mounted upon one side of said platform, crank shafts supported by bearings carried by said platform and said frame, a plurality of rock gathering devices carried by said crank shafts, said rock gathering devices connected to said crank shafts in such a manner that the rotation of the crank shafts will impart reciprocatory movement to the rock gathering devices, a shaft carried by said frame, a traction wheel rigidly mounted upon said shaft, means connected to said shaft whereby said crank shafts and said carrier will be operated by the rotation of said traction wheel, and means for elevating the rocks gathered into a wagon bed, said means operated by the rotation of said traction wheel.

11. In a rock picking machine; a frame, a platform connected to one end of said frame, a carrier supported by said platform, a plurality of guard members mounted upon one side of said platform, crank shafts supported by bearings carried by said platform and said frame, a plurality of rock gathering devices carried by said crank shafts, said rock gathering devices connected to said crank shafts in such a manner that the rotation of the crank shafts will impart reciprocatory movement to the rock gathering devices, a shaft carried by said frame, a traction wheel rigidly mounted upon said shaft, means connected to said shaft whereby said crank shafts and said carrier will be operated by the rotation of said traction wheel, means for elevating the rocks gathered into a wagon bed, said means rotatable by the rotation of said traction wheel, and means coacting with means carried by said traction wheel carrying shaft for moving said rock gathering devices and said platform into or out of an operative position.

12. In a rock picking machine; a frame, a platform connected to one end of said frame, a carrier supported by said platform, guard members mounted forwardly of said platform, crank shafts journaled upon said platform and said frame, reciprocable arms secured to one of said shafts, rock picking teeth, raking arms carrying said teeth, and pivoted to first said arms, adjustable resilient means connecting said raking arms with the other of said crank shafts, a traction wheel mounted by said frame, driving means for operating said crank shafts, and said carrier by movement of the machine upon said wheel, and means for elevating the rocks gathered by said teeth and deposited upon said carrier into a wagon bed.

In testimony whereof I affix my signature in presence of two witnesses.

MANFORD C. PREVO.

Witnesses:
  MALONE COX,
  ISAAC MURRAY.

Copies of this patent may be obtained for five cents each, by addressing the "Commissioner of Patents, Washington, D. C."